March 4, 1969 G. IRWIN 3,431,542
FLASHCUBE SOCKETS
Filed June 23, 1967 Sheet 1 of 4

INVENTOR
George Irwin
by McDougall, Hersh,
Scott and Ladd Att'ys

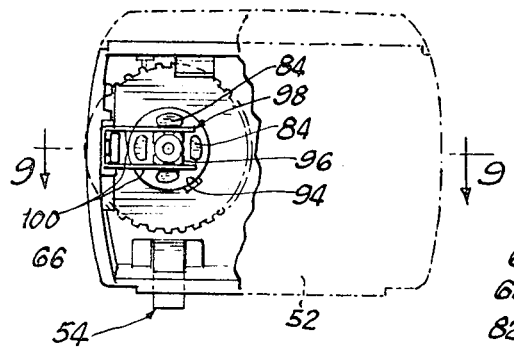
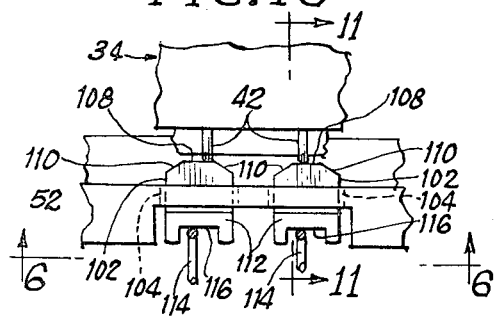
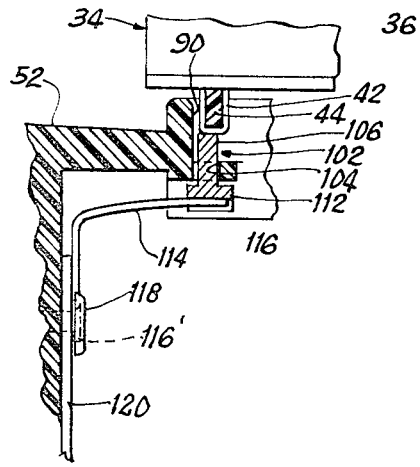
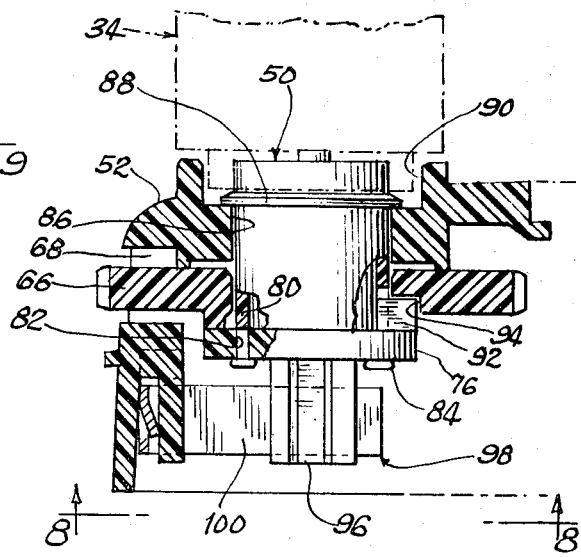
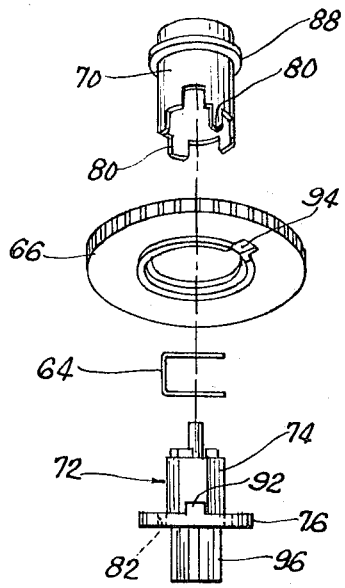

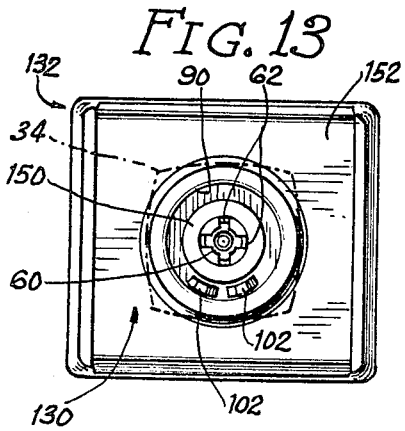
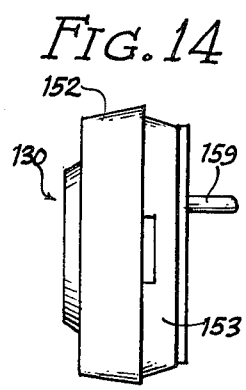
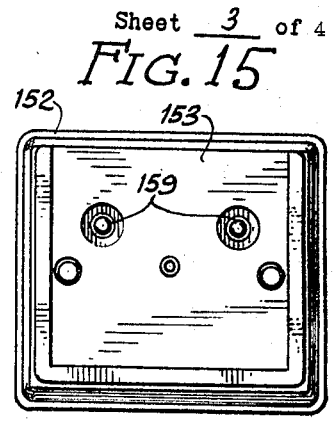
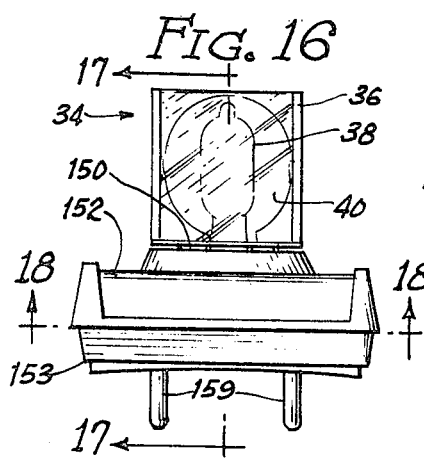
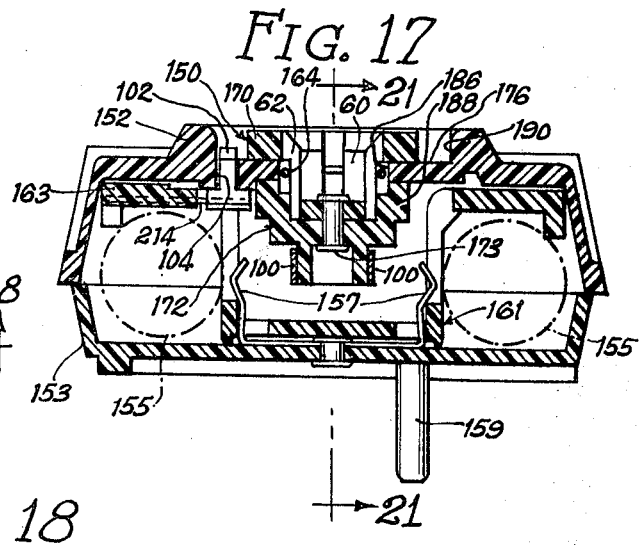
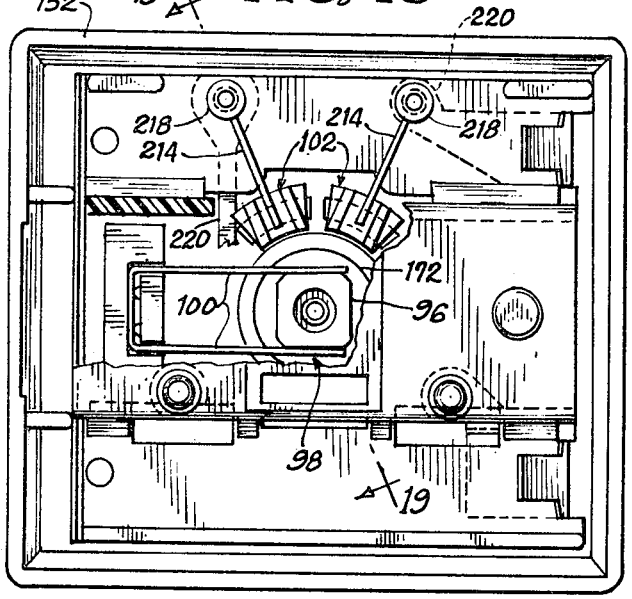
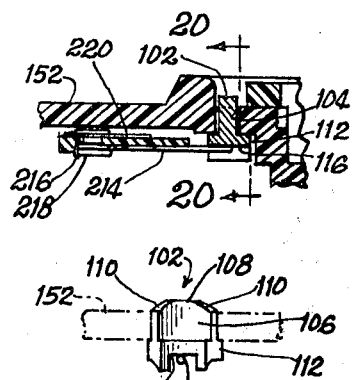

March 4, 1969
G. IRWIN
3,431,542
FLASHCUBE SOCKETS
Filed June 23, 1967
Sheet 4 of 4
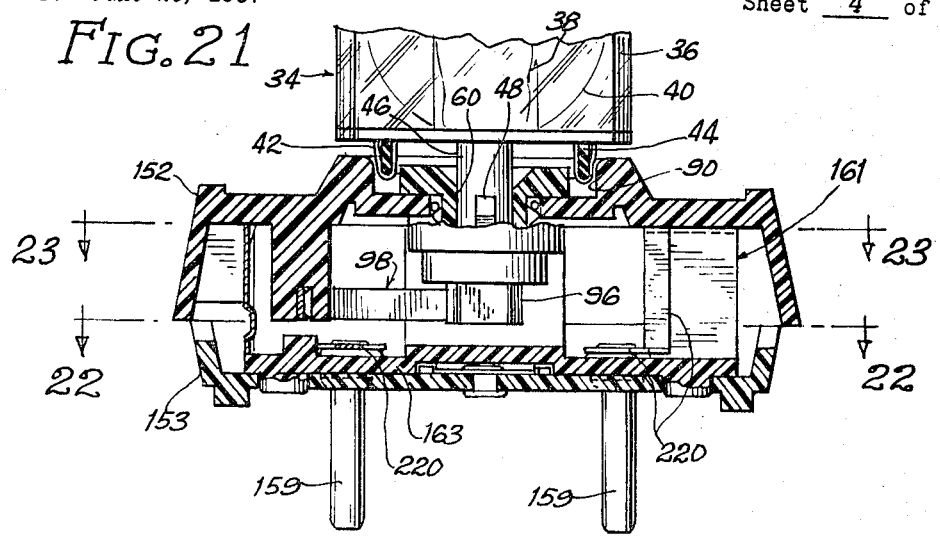
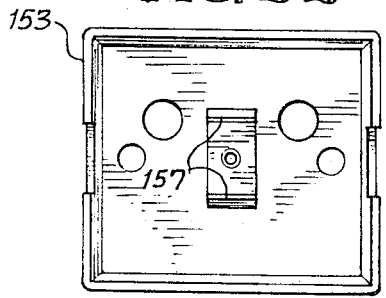
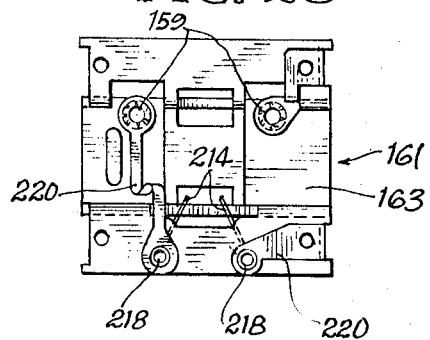

United States Patent Office 3,431,542
Patented Mar. 4, 1969

3,431,542
FLASHCUBE SOCKETS
George Irwin, Highland Park, Ill., assignor to Imperial Camera Corp., Chicago, Ill., a corporation of Delaware
Filed June 23, 1967, Ser. No. 648,281
U.S. Cl. 339—247   14 Claims
Int. Cl. H01r *3/00, 13/24*

ABSTRACT OF THE DISCLOSURE

A flashcube socket having contact blocks for engaging the terminal wires on a flashcube, said contact blocks being made of sintered metal and being slidable in guide openings formed in a supporting member adjacent the rotary turret which supports the flashcube, flexible resilient wire spring arms being provided to bias the contact blocks outwardly, each contact block having an outer portion with a contact surface and ramps leading up to the contact surface, and an inner portion with flange means for limiting the outward movement of the block, and a recess for receiving and retaining the corresponding spring.

---

This invention relates to sockets for holding photographic flashcubes which are cube-shaped units comprising four small flash bulbs, each with an individual reflector and a pair of terminal wires.

A flashcube socket generally comprises a rotary turret or carrier for holding a flashcube. The turret is rotatable into four successive positions so that all four flash bulbs will be used. The turret may be rotated manually, or by means of a mechanism which rotates the turret when the film is advanced, in the camera with which the flashcube socket is associated. Electrical contacts are provided to engage the terminal wires of the forwardly facing flash bulb on the flashcube.

The present invention provides a flashcube socket in which the contacts for engaging the terminal wires on the flashcube are constructed and arranged so as to be highly reliable, trouble free, and long lasting, yet extremely economical. The contacts of the present invention never need to be adjusted, either at the time of initial assembly or in the field.

In accordance with the present invention, the contacts are preferably in the form of metal blocks made of sintered metal. Thus, the blocks are molded from powdered metal and are sintered, so as to unify the powdered metal into a solid mass. The contact blocks are preferably mounted in guide openings formed in a supporting member, adjacent the rotary turret, for engagement by the terminal wires of the flashcube. The blocks are biased outwardly by springs preferably in the form of spring arms made of flexible resilient wire. Recesses are preferably formed in the inner portions of the blocks to receive and retain the springs. The inner portions of the blocks are preferably formed with flange means to limit the outward sliding movement of the blocks. The outer portion of each block is preferably formed with a contact surface, and a pair of ramps leading up to the opposite ends thereof.

Further objects and advantages of the present invention will appear from the following description, taken with the accompanying drawings, in which:

FIG. 8 is a fragmentary bottom view of the rotary turret, taken generally along the line 8—8 in FIG. 9.

FIG. 9 is a vertical section taken through the turret, generally along the line 9—9 in FIG. 8.

FIG. 10 is a fragmentary enlarged elevation, taken generally along the line 10—10 in FIG. 6.

FIG. 11 is a fragmentary enlarged vertical section, taken generally along the line 11—11 in FIG. 10.

FIG. 12 is an exploded or disassembled perspective view of the rotary turret.

FIG. 13 is a top view of a flash adaptor comprising another embodiment of the present invention.

FIGS. 14, 15 and 16 are side, bottom, and front views of the flash adaptor of FIG. 13. FIG. 17 is an enlarged vertical section, taken generally along the line 17—17 in FIG. 16.

FIG. 18 is a bottom view of the adaptor, with the bottom cover removed, and with certain parts broken away, the view being taken generally along the line 18—18 in FIG. 16.

FIG. 19 is a fragmentary vertical section, taken generally along the line 19—19 in FIG. 18.

FIG. 20 is a fragmentary elevation showing one of the contact blocks, the view being taken generally along the line 20—20 in FIG. 19.

FIG. 21 is a vertical section, taken along the line 21—21 in FIG. 17.

FIG. 22 is a top view of the bottom cover, taken generally as indicated by the line 22—22 in FIG. 21.

FIG. 23 is a top view of a sub-assembly, taken generally along the line 23—23 in FIG. 21.

Figure 1:
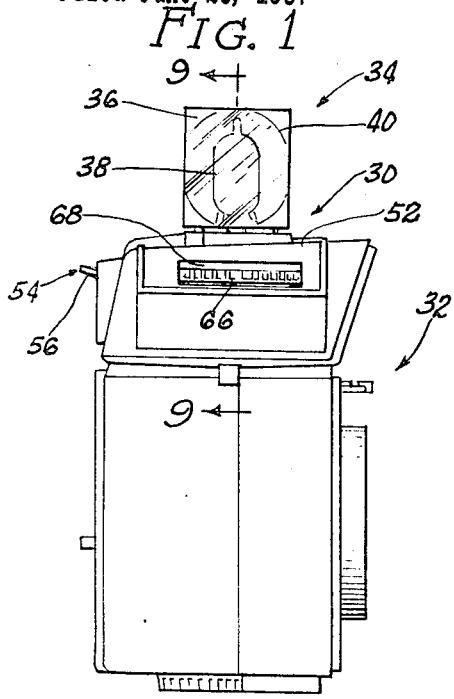
FIG. 1 is a side view of a camera equipped with a flashcube socket to be described as an illustrative embodiment of the present invention.
Figure 2:
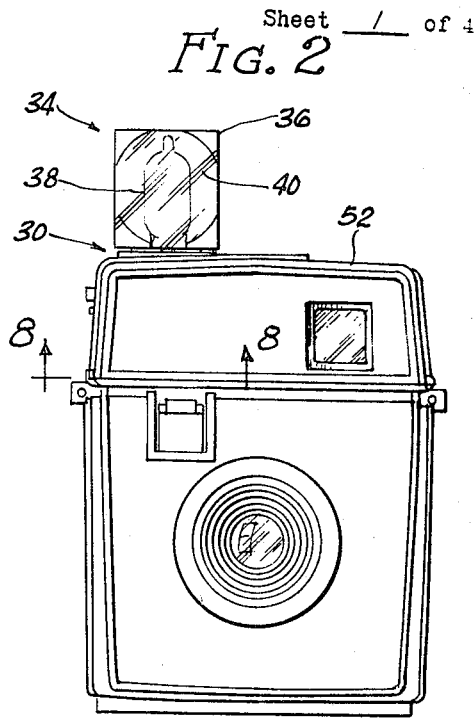
FIGS. 2 and 3 are front and top views of the camera.
Figure 3:
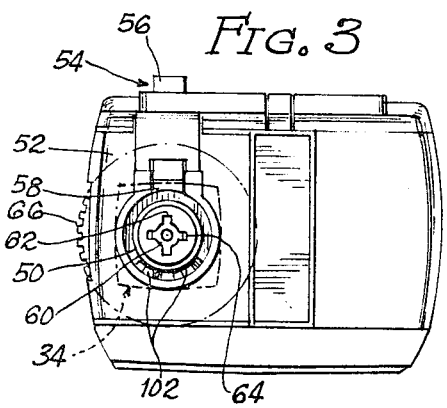

As already indicated, FIGS. 1–12 illustrate a flashcube socket 30 which is incorporated into a camera 32. The socket 30 is adapted to receive a flashcube 34, of a type which will be known to those skilled in the art. Thus, the flashcube 34 comprises a transparent, cube-shaped housing 36. Four small flash bulbs 38 are mounted within the housing 36. Each flash bulb 38 has a reflector 40.

Figure 4:
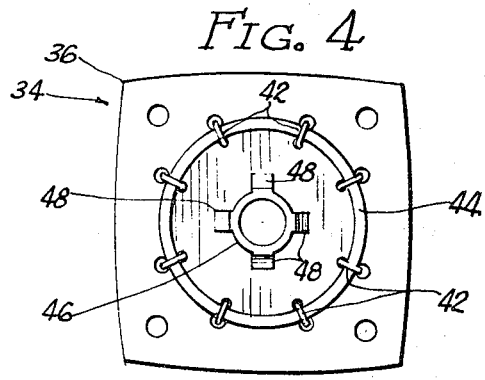
FIG. 4 is an enlarged bottom view of one of the flashcubes.
Figure 5:
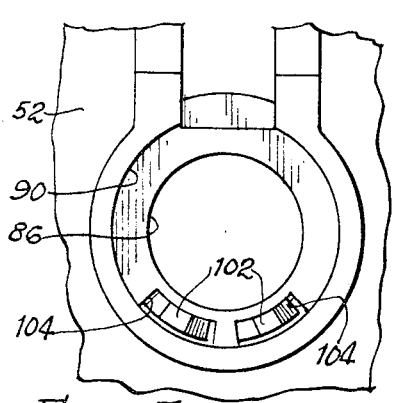
FIG. 5 is a fragmentary enlarged top view of the socket.
Figure 6:
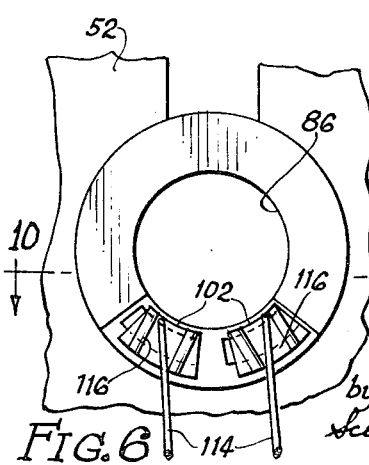
FIG. 6 is a fragmentary enlarged bottom view of the socket, taken generally along the line 6—6 in FIG. 10.
Figure 7:
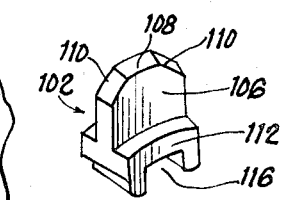
FIG. 7 is an enlarged perspective view of one of the contact blocks.

As shown in FIG. 4, the terminals of the flash bulbs 38 are in the form of wires 42 which are brought out of the bottom of the housing 36 and are wrapped around a downwardly projecting flange 44. There are eight of the wires 42, equally spaced around the flange 44.

A locating member or sleeve 46 projects downwardly from the flashcube housing 36 along the vertical axis thereof. A plurality of lugs or ears 48 project outwardly from the sleeve 46, four such lugs being illustrated.

The flashcube socket 30 comprises a rotary turret 50 for receiving and holding the flashcube 34. The turret 50 is rotatably mounted on a supporting member in the form of a housing 52. It will be seen that the housing 52 is mounted on the camera 32.

A lever 54 is provided to eject the flashcube 34 from the socket 30. As shown, the lever 54 comprises a rearwardly projecting arm 56 and an upwardly projecting arm 58. The arm 56 is adapted to be operated by the thumb or finger of the person operating the camera. When the arm 56 is pushed downwardly, the arm 58 moves upwardly under the flashcube and pushes it out of the socket 30.

The rotary turret 50 is formed with an opening 60 for receiving the locking sleeve 46 on the flashcube 34. The opening 60 is formed with grooves or slots 62, for receiving the lugs 48. The engagement of the lugs 48 with the grooves 62 insures that the flashcube 34 will rotate with the turret 50.

Within the turret 50, a detent spring 64 is provided to engage and retain the lugs 48 on the flashcube. The action of the detent spring 64 is sufficient to retain the flashcube 34 against accidental dislodgement from the socket 30. However, the retaining action of the detent spring 64 is easily overcome by the ejection lever 54.

The flashcube socket 30 comprises means for rotating the turret 50. In the illustrated construction, such means take the form of a thumbwheel 66 which is mounted on the turret 50, so as to project outwardly through a slot 68 in the side of the housing 52. Thus, the turret 50 is rotated manually by the operator. However, in a more complex construction, the turret could be coupled to the film advancing mechanism of the camera 32.

As shown in FIG. 12, the rotary turret 50 comprises two parts, 70 and 72, in addition to the thumbwheel 66 and the detent spring 64. The two parts 70 and 72 form the upper and lower portions of the rotary turret 50. The upper part 70 is generally in the form of a cylindrical sleeve. It will be seen that the lower part 72 is formed with a cylindrical member 74. A flange 76 projects outwardly from the lower part 72, at the lower end of the cylindrical member 74. The upper part 70 is adapted to slip over the cylindrical member 74. Prongs 80 are formed on the lower end of the upper part 70 and are adapted to extend through slots 82 in the flange 76. Both parts 70 and 72, as well as the thumbwheel 66, are preferably made of suitable resinous plastic materials. To retain the prongs 80 in the slots 82, the lower ends of the prongs may be flattened against the flange 76 by the application of heat and pressure to form retaining elements 84, as shown in FIG. 9.

The rotary mounting of the turret 50 is provided by a cylindrical guide opening 86 which is formed in the housing 52. The cylindrical upper part 70 of the turret is rotatable within the opening 60. A flange 88 projects outwardly from the upper part 70, to limit the downward movement of the upper part through the opening 86.

As shown in FIG. 9, a cylindrical recess 90 is formed in the upper side of the housing 52, around the guide opening 86, to receive the flange 44 on the flashcube 34. The flange 88 on the turret 50 engages the housing 52 within the recess 90.

It will be seen that the thumbwheel 66 is mounted around the upper part 70 of the turret 50. The thumbwheel 66 is retained between the housing 52 and the flange 76 on the lower part 72 of the turret. Drive elements are provided between the turret 50 and the thumbwheel 66, to insure that the thumbwheel will rotate with the turret. As shown, a key 92 is formed on the lower part 72 of the turret 50. The key 92 is adapted to be received in a slot 94, formed in the thumbwheel 66.

Means are provided to detain the turret in each of its four positions. As shown, the turret 50 comprises a square detent member 96 which projects downwardly from the lower end of the lower part 72 on the turret 50. The detent member 96 is engaged by a detent spring 98, mounted on the housing 52. The illustrated detent spring 98 is U shaped to provide a pair of arms 100 which are engageable with opposite sides of the detent member 96.

The flashcube socket 30 comprises contact means which are engageable with the terminal members 42 on the flashcube 34. Such contact means are adapted to supply electrical current to the front pair of terminal members or wires 42. In the illustrated construction, such contact means comprise a pair of contact members 102, which project upwardly through slots 104 in the housing or supporting member 52.

The contact members 102 are preferably in the form of metal blocks. Such blocks are preferably made of sintered metal, so that the blocks can be molded from powdered metal, and then sintered by the application of heat, so as to unite the powdered metal into a solid mass.

The contact blocks 102 project upwardly through the slots 104 within the recess 90. Preferably, the blocks 102 and the slots 104 are arcuate in shape.

It will be seen that each contact block 102 is illustrated as comprising an upper portion 106, which projects upwardly through the corresponding slot 104. A contact surface 108 is formed on the upper end of the upper portion 106. Inclined ramps 10 lead up to the contact surface 108, at both ends thereof. The ramps 110 guide the terminal wires 42 of the flashcube 36 as the flashcube is rotated.

At its lower end, each contact block 102 preferably comprises an outwardly projecting flange 112, adapted to engage the housing 52, so as to limit the upward movement of the contact block.

Spring means are provided to bias the contact blocks 102 upwardly, so that they will project above the housing 52, within the recess 90. Such spring means preferably comprise a pair of flexible resilient spring arms 114 Preferably, the spring arms 114 are made of spring wire. Each contact block 102 is preferably formed with a recess or slot 116 for receiving and retaining the corresponding spring arm 114.

As shown in FIG. 11, the spring arms 114 are mounted on the supporting member or housing 52. In this case, the spring arms 114 are generally L shaped. The lower end of the L-shaped arm 114 is preferably formed with a loop 116', which is secured to the housing 52 by means of a rivet 118, or some other fastener. The L-shaped spring arm 114 extends outwardly and upwardly and then generally in a horizontal direction, to engage the corresponding contact block 102.

The spring arms 114 are adapted to supply electrical current to the contact blocks 102, which in turn supply the current to the terminal wires 42 on the flashcube 34. The current may be supplied to the spring arms 114 by electrical leads, which may take the form of straps 120 clamped between the loops 116' and the housing 52.

The contact blocks 102 are positioned so that the front pair of terminal wires 42 on the flashcube 34 will engage the blocks. As the flashcube 34 is rotated, the wires 42 ride over the blocks 102 and cause downward movement of the blocks, against the biasing action of the springs 114.

The contact blocks 102 and the contact springs 114 never need adjustment. Initially, the blocks 102 and the springs 114 may be mounted on the housing 52 by straightforward assembly operations, without any adjustments. The sintered metal contact blocks 102 are not subject to any substantial wear due to normal use. Thus, the contact blocks 102 provide long, dependable and trouble-free service.

FIGS. 13–23 illustrate a modified flashcube socket 130 which is similar to the previously described socket 30, but is incorporated into a flash attachment or adaptor 132, rather than a camera. Most of the components of the flashcube socket 130 are the same as previously described. To that extent, the components have been given the same reference characters, so that the previous description will be applicable. The present description will be largely confined to the differences between the flashcube socket 130 and the socket 30, previously described.

The flashcube socket 130 comprises a rotary turret 150, which is similar to the previously described turret, except that the thumbwheel 66 is omitted. The operator rotates the turret by grasping and rotating the flashcube 34.

The turret 150 is rotatably mounted on a supporting member in the form of a housing 152. It will be seen that the housing 152 has a removable bottom closure 153. Space is provided within the housing 152 to receive batteries 155, adapted to provide the electrical current for igniting the flash bulbs. The closure 153 is retained on the housing 152 by means of detent springs 157.

The flash attachment 132 is provided with terminals 159, whereby the attachment may be connected to a camera. The illustrated terminals 159 are in the form of downwardly projecting prongs. To support the prongs 159, a sub-assembly 161 is mounted within the housing 152. The sub-assembly 161 is shown separately in FIG. 23. As illustrated, the sub-assembly 161 comprises an auxiliary supporting member 163 which is preferably made of a resinous plastic or other insulating material. The member 163 is rigidly secured to the housing 152.

The rotary turret 150 comprises upper and lower parts, 170 and 172, which correspond generally to the upper and lower parts 70 and 72, previously described. However, the upper part 170 slips into the lower part 172. The two parts 170 and 172 are secured together by means of an axial rivet or other fastener 173. A flange 176 projects outwardly from the lower part 172. The upper part 170 is rotatably mounted in a cylindrical guide opening 186, formed in the housing 152. A flange 188 projects outwardly from the upper part 170. It will be seen that the flanges 176 and 188 are on opposite sides of the housing 152, around the guide opening 186.

In the flashcube socket 130, the arrangement for retaining the flashcube 34 on the rotary turret 150 is similar to the arrangement previously described. Thus, the opening 60 and the slots 62 for receiving the flashcube may be essentially the same as previously described. The flashcube socket 130 has a detent spring 164 which preferably is circular rather than U shaped. The square detent member 96 and the U-shaped detent spring 98 are substantially the same as previously described.

It will be evident from FIGS. 18-20 that the contact blocks 102 are substantially the same as previously described. However, the flashcube socket 130 employs slightly modified biasing springs 214 for the contact blocks 102. The springs 214 are preferably in the form of wire spring arms which are substantially straight, rather than being L shaped, as in the case of the springs 114. The springs 214 are formed with loops 216 which are secured to the supporting member 163 by means of rivets 218 or other fasteners. Electrical current is supplied to the springs 214 by means of electrical leads in the form of straps 220, clamped under the rivets 218.

In both of the illustrated flashcube sockets 30 and 130, the contact blocks 152 are preferably made of sintered brass, but other sintered metals may also be employed. Thus, the contact blocks may be manufactured at a low cost, despite the fact that they are rather intricate in shape. The blocks may be molded from powdered metal, and then sintered to unify the powdered metal into a solid mass.

The flanges 112 on the contact blocks determine quite accurately the extent to which the blocks project through the slots 104 and above the housing of the flash camera or attachment. The spring arms bias the contact blocks outwardly, for engagement with the terminal wires 42 on the flashcube. When the flashcube is rotated, the terminal wires 42 ride up the ramps 110 on the contact blocks 102, and over the contact surfaces 108. Thus, good electrical contact is established between the terminal wires and the contact blocks. It will be evident that the conatct blocks do not interfere with the rotation of the flashcube.

The contact blocks provide trouble-free service and long wear. No adjustment or other attention to the flashcube socket should ever be necessary throughout the life of the camera or flash attachment.

Various other modifications, alternative constructions and equivalents may be employed without departing from the true spirit and scope of the invention, as exemplified in the foregoing description and defined in the following claims.

I claim:
1. In a socket for flashcubes,
the combination comprising a supporting member,
a rotary turret mounted on said member for receiving and holding a flashcub,
a pair of contact blocks mounted on said member for engaging the terminal wires of the flashcube,
said supporting member having means thereon forming guide openings for receiving said contact blocks,
said contact blocks being slidable inwardly and outwardly in said guide openings,
and springs acting between said supporting member and said contact blocks for biasing said blocks outwardly,
said springs being separate from said contact blocks but in engagement therewith.

2. A combination according to claim 1,
in which said springs are in the form of flexible spring arms mounted on said supporting member and engaging said contact blocks.

3. A combination according to claim 1,
in which said contact blocks are made of sintered metal.

4. A combination according to claim 1,
in which each of said contact blocks has an outer portion projecting through the corresponding guide opening,
and an inner portion with flange means thereon for engaging said supporting member and thereby limiting the outward movement of the block.

5. In a socket for flashcubes, the combination comprising
a supporting member,
a rotary turret mounted on said member for receiving and holding a flashcube,
a pair of contact blocks mounted on said member for engaging the terminal wires of the flashcube,
said supporting member having means thereon forming guide openings for receiving said contact blocks,
said contact blocks being slidable inwardly and outwardly in said guide openings,
and springs acting between said supporting member and said contact blocks for biasing said blocks outwardly,
each of said springs being in the form of a spring arm of resilient flexible wire mounted on said supporting member and engaging the corresponding contact block.

6. A combination according to claim 5,
in which each of said spring arms is substantially L shaped.

7. A combination according to claim 5,
in which each of said spring arms is substantially straight.

8. A combination according to claim 5,
in which each of said spring arms is formed with a loop,
and in which a fastener extends through said loop to mount said spring arm on said supporting member.

9. In a socket for flashcubes, the combination comprising
a supporting member,
a rotary turret mounted on said member for receiving and holding a flashcube,
a pair of contact blocks mounted on said member for engaging the terminal wires of the flashcube,
said supporting member having means thereon forming guide openings for receiving said contact blocks,
said contact blocks being slidable inwardly and outwardly in said guide openings,
and springs acting between said supporting member and said contact blocks for biasing said blocks outwardly,
each of said contact blocks comprising an outer surface for engaging the terminal wires,
and a pair of ramp surfaces leading up to the opposite ends of said outer surface.

10. In a socket for flashcubes, the combination comprising
a supporting member,
a rotary turret mounted on said member for receiving and holding a flashcube,
a pair of contact blocks mounted on said member for engaging the terminal wires of the flashcube, said supporting member having means thereon forming guide openings for receiving said contact blocks, said contact blocks being slidable inwardly and outwardly in said guide openings, and springs acting between said supporting member and said contact blocks for biasing said blocks outwardly, each of said guide openings being arcuate in shape, each contact block being of a corresponding arcuate shape.

11. In a socket for flashcubes, the combination comprising a supporting member, a rotary turret mounted on said member for receiving and holding a flashcube, a pair of contact blocks mounted on said member for engaging the terminal wires of the flashcube, said supporting member having means thereon forming guide openings for receiving said contact blocks, said contact blocks being slidable inwardly and outwardly in said guide openings, and springs acting between said supporting member and said contact blocks for biasing said blocks outwardly, each of said contact blocks comprising an inner portion having a recess therein for receiving and retaining the corresponding spring.

12. A combination according to claim 11, in which each of said contact blocks comprises an outer portion extending through the corresponding opening, said inner portion having flange means thereon for engaging said supporting member and thereby limiting outward movement of the block.

13. A combination according to claim 12, in which each of said springs is in the form of a spring arm of resilient flexible wire mounted on said supporting member and received in the recess on the corresponding contact block.

14. A combination according to claim 12, in which said contact blocks are made of sintered metal.

References Cited

UNITED STATES PATENTS 2,721,090 10/1955 Kaman _____ 287—119
3,353,468 11/1967 Beach _____ 240—1.3 X

FOREIGN PATENTS 504,993 8/1951 Belgium.

RICHARD E. MOORE, *Primary Examiner.*

U.S. Cl. X.R.

339—255, 278